Aug. 22, 1933.  E. H. LEHMAN  1,923,315
HAND BRAKE
Filed April 27, 1931
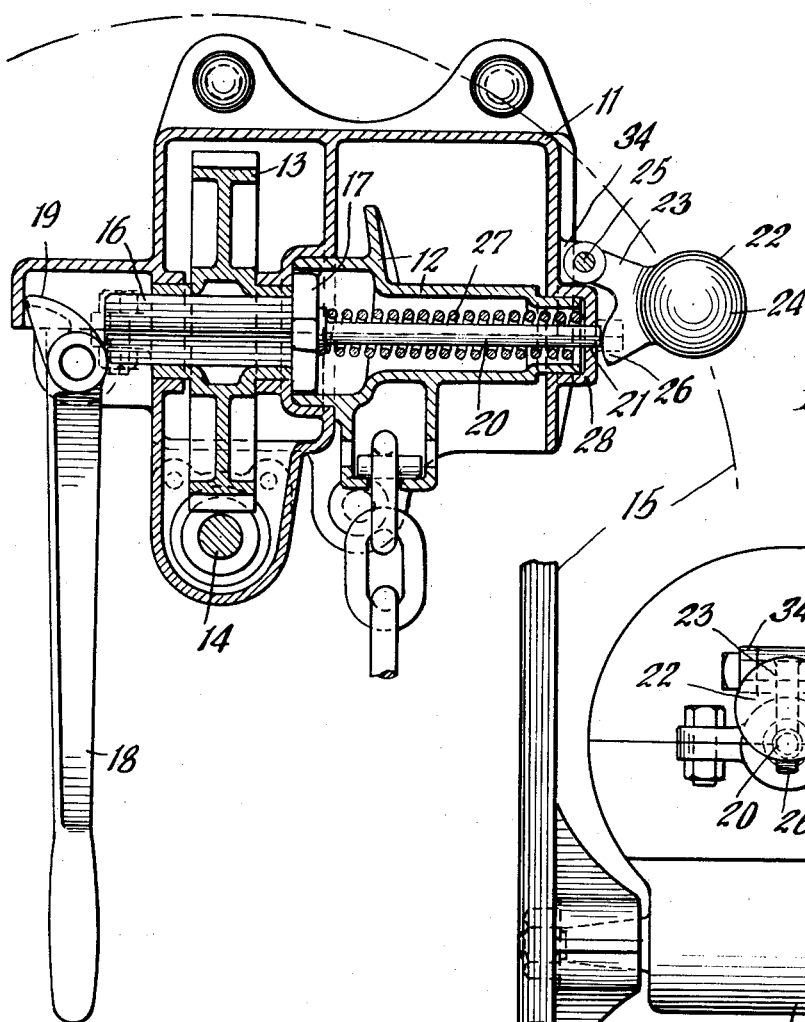
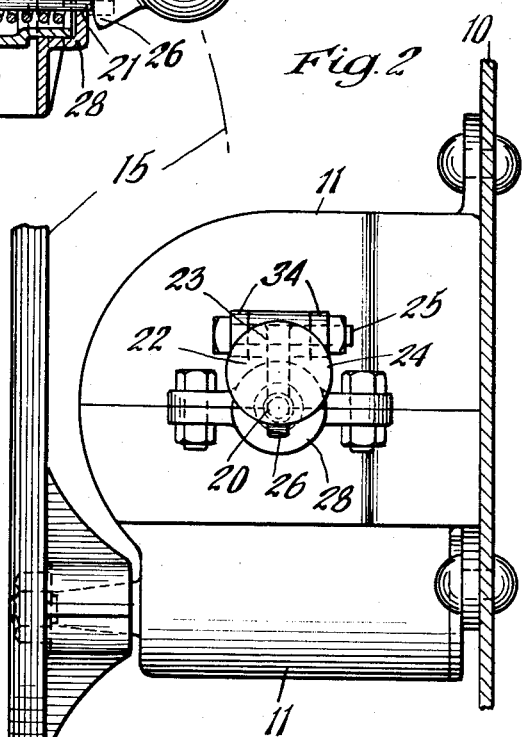
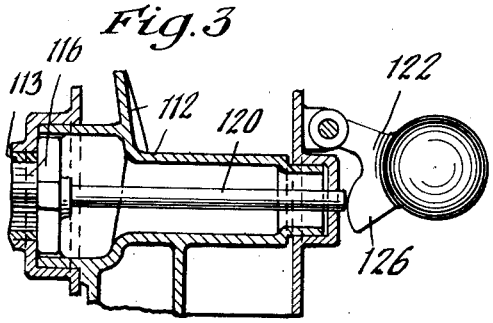
Witness
Wm. Geiger
Inventor
Edward H Lehman
By Henry Fuchs, Atty.

Patented Aug. 22, 1933

1,923,315

UNITED STATES PATENT OFFICE 1,923,315

HAND BRAKE

Edward H. Lehman, Chicago, Ill., assignor to W. H. Miner, Inc., Chicago, Ill., a Corporation of Delaware Application April 27, 1931. Serial No. 533,152

6 Claims. (Cl. 74—112)

This invention relates to improvements in hand brakes.

The main object of the invention is to provide in a hand brake mechanism of the power-multiplying, worm gear-driven type, wherein releasable clutch means is provided for operatively connecting the worm gearing and chain-winding drum, simple and reliable means for automatically returning the clutch to engaging position and yieldingly maintaining the same thus engaged.

In the drawing, forming a part of this specification, Figure 1 is a vertical sectional view through a hand brake mechanism, embodying my improvements, said mechanism being illustrated as mounted on the end wall of a railway car. Figure 2 is a side elevational view of the brake mechanism illustrated in Figure 1 and looking from the right in said figure, the vertical end wall of the car being shown in section. And Figure 3 is a view similar to Figure 1, showing a part of the brake mechanism and illustrating a different embodiment of the invention.

Referring first to the embodiment of the invention illustrated in Figures 1 and 2, 10 designates the vertical end wall of a car on which my improved hand brake mechanism is supported. As shown, the mechanism is enclosed within a housing 11 which is fixed to said end wall, the housing being provided with securing lugs through which rivets extend which also pass through the wall 10.

In carrying out my invention I provide a rotary chain-winding drum 12 which is supported in suitable bearing members provided in the housing 11. A driving worm wheel 13 is rotatably supported within the housing within suitable bearings and cooperates with a worm member 14 which is rotatable about an axis at right angles to the axis of rotation of the chain-winding drum and is disposed below the worm wheel 13. The worm is actuated by the usual hand wheel 15 which is secured to the outer end of the shaft carrying the worm. The worm wheel 13 and the chain-winding drum are in alignment and a clutch member 16 is slidably mounted in the hub of the worm wheel 13. The clutch 16 has a stem of square cross section fitting the opening of the hub of the worm wheel 13 so that the clutch is slidable with respect to said worm wheel but rotatable in unison therewith. At the inner end, the clutch is provided with a head 17 which cooperates with suitable clutch formations on the interior of the chain-winding drum. The details of construction of the cooperating clutch means of the head and chain-winding drum are not shown in the drawing, same being fully described in connection with Olander application, Serial No. 472,235, filed August 1, 1930, to which reference may be had. The sliding clutch is actuated by a cam lever 18 pivoted at its upper end in the housing and having a cam head 19 which engages the outer end of the shank of the clutch member. At the opposite end to the shank the clutch member is provided with a rod-like stem 20 which has the outer end thereof slidingly guided in a bearing opening 21 provided in the right-hand side wall of the housing, as viewed in Figure 1. A gravity-influenced cam lever 22 is pivotally suspended from the housing so as to cooperate with the projecting end of the rod 20. As shown, the cam lever 22 comprises an arm 23 having a relatively large weight member 24 at the outer end thereof and being pivotally supported at the inner end by a pin 25 extending through said end and a pair of ears 34—34 projecting from the right-hand side wall of the housing, as viewed in Figure 1. Below the arm 23 the lever 22 is provided with a cam head 26 which bears directly on the extremity of the rod 20. A spring 27 is also employed to urge the clutch to engaged position, the same being interposed between the head 17 of the clutch and the end wall of a bearing boss 28 formed on the right-hand end wall of the housing, as shown in Figure 1. The spring 27 is preferably so arranged as to surround the stem 20.

Referring next to the embodiment of the invention illustrated in Figure 3, the construction is substantially the same as that shown in Figures 1 and 2, with the exception that the spring which cooperates with the clutch is omitted. In Figure 3, a chain-winding drum 112, the hub of the worm wheel 113, the clutch member 116, and a weighted clutch-actuated cam lever 122 are shown, which are similar to the corresponding parts illustrated in Figure 1 and hereinbefore described. The clutch member is provided with a stem in the form of a rod 120 which cooperates with the cam head 126 of the weighted lever 122 in the same manner as the similar parts hereinbefore described and shown in connection with Figure 1.

In the operation of both forms of the invention, the clutch is disengaged from the chainwinding drum by swinging the lever 18 upwardly away from the housing, the cam head 19 forcing the clutch to the right, as viewed in Figures 1 and 2. The chain-winding drum is thus freed to rotate with respect to the other parts of the brake mechanism, thereby preventing spinning of the hand wheel. When the actuating lever 18 is permitted to drop to the vertical position shown in Figure 1, weighted lever 22, through the action of gravity, forces the clutch to the left, as viewed in Figures 1 and 3, thereby re-engaging the same with the chain-winding drum and operatively connecting the latter to the driving worm wheel 13. In the embodiment of the invention shown in Figures 1 and 2, the spring 27 assists in returning the clutch to operative engagement, the same being compressed during sliding movement of the clutch to the right, as viewed in Figure 1. As will be evident, the weighted lever forms a safety device in case of the failure of the spring, thereby assuring that the clutch will at all times be re-engaged at the proper time to operatively connect the chain-winding drum and driving mechanism of the brakes.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain-winding element; of a rotary actuating element for said winding element; a releasable clutch member having sliding engagement with one of said elements and rotatable therewith; a head on said clutch member having clutching engagement with the other element; a fixed stem on said clutch member; manually actuated means for sliding said clutch member to disengage the same from said rotary winding element; and a lever pivotally supported at its upper end, said lever having a weighted portion below the pivot thereof, said weighted portion having a cam projection thereon engaging with the end of the clutch stem for urging said clutch member to engaging position.

2. In a hand brake mechanism for railway cars, the combination with a supporting member mounted on the car; of a chain-winding drum journaled in said supporting member; power multiplying means for rotating said drum, including a gear member journaled in said support; a sliding clutch element rotatable with the gear and having a clutch head cooperating with said drum for operatively connecting the gear and drum for rotation in unison; lever means for sliding the clutch to disengage the same from said drum; a stem on said clutch; guide means for said stem on the supporting member; and a weighted lever engageable with said stem; and means on the supporting member for pivotally suspending said weighted lever above the center of gravity thereof, whereby the same urges the clutch member into clutching engagement with the drum.

3. In a hand brake mechanism for railway cars, the combination with a supporting member mounted on the car; of a chain-winding drum journaled in said supporting member; power multiplying means for rotating said drum, including a gear member journaled in said support; a sliding clutch element rotatable with the gear and having a clutch head cooperating with said drum for operatively connecting the gear and drum for rotation in unison; lever means for sliding the clutch to disengage the same from said drum; a stem on said clutch; guide means for said stem on the supporting member; and a weighted lever pivotally suspended from the supporting member, said lever having a cam head engaging the outer end of the stem to force said clutch into clutching engagement.

4. In a hand brake mechanism for railway cars, the combination with a supporting member mounted on the car; of a chain-winding drum journaled in said supporting member; power multiplying means for rotating said drum, including a gear member journaled in said support; a sliding clutch element rotatable with the gear and having a clutch head cooperating with said drum for operatively connecting the gear and drum for rotation in unison; lever means for sliding the clutch to disengage the same from said drum; a stem on said clutch; guide means for said stem on the supporting member; and means for yieldingly urging said clutch member into clutching engagement, including a spring surrounding said stem and bearing on said clutch, and a gravity actuated pendulum member having bearing engagement with the outer end of said stem.

5. In a hand brake mechanism, the combination with a rotary chain-winding element; of means for rotating said element; a sliding releasable clutch member operatively connecting said means and element; a stem projecting from said clutch member; manually actuated lever means for disengaging said clutch member; and yielding means including a gravity-actuated weighted pendulum member swingingly suspended at its upper end and having an outstanding arm below the pivot thereof bearing on the end of said stem for actuating the same to urge the clutch to engaged position.

6. In a hand brake mechanism, the combination with a rotary chain-winding element; of means for rotating said element; a sliding releasable clutch member operatively connecting said means and element, said member having a projection thereon; manually actuated lever means for disengaging said clutch member; and a weighted lever having an outstanding finger bearing on the projection of the clutch member for urging the latter to engaged position, said lever being pivotally supported at its upper end above the clutch member.

EDWARD H. LEHMAN.